US009298683B2

(12) United States Patent
Bhatt et al.

(10) Patent No.: US 9,298,683 B2
(45) Date of Patent: Mar. 29, 2016

(54) GENERATION OF TEST DATA USING TEXT ANALYTICS

(71) Applicant: International Business Machines Corporation, Armonk, NY (US)

(72) Inventors: Dhruv A. Bhatt, Indian Trail, NC (US); Kristin E. McNeil, Charlotte, NC (US); Nitaben A. Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 13/889,401

(22) Filed: May 8, 2013

(65) Prior Publication Data

US 2014/0115438 A1    Apr. 24, 2014

Related U.S. Application Data

(63) Continuation of application No. 13/655,847, filed on Oct. 19, 2012.

(51) Int. Cl.
*G06F 17/24* (2006.01)
*G06F 11/36* (2006.01)

(52) U.S. Cl.
CPC .......... *G06F 17/241* (2013.01); *G06F 11/3684* (2013.01); *G06F 17/248* (2013.01)

(58) Field of Classification Search
CPC .................................................. G06F 17/241
USPC ....................................................... 715/230
See application file for complete search history.

(56) References Cited

U.S. PATENT DOCUMENTS

| 5,878,054 | A | 3/1999 | Sherwood et al. |
| 6,182,029 | B1 * | 1/2001 | Friedman ............ G06F 17/2705 704/9 |
| 7,139,752 | B2 | 11/2006 | Broder et al. |
| 7,610,192 | B1 | 10/2009 | Jamieson |
| 8,234,560 | B1 * | 7/2012 | Zhou ................. G06F 17/30625 707/821 |

(Continued)

FOREIGN PATENT DOCUMENTS

WO    2012092669 A1    7/2012

OTHER PUBLICATIONS

Mooney, Raymond J., and Razvan Bunescu. "Mining knowledge from text using information extraction." ACM SIGKDD explorations newsletter 7.1 (2005): 3-10.*

(Continued)

*Primary Examiner* — Frank D Mills
(74) *Attorney, Agent, or Firm* — Edward J. Wixted, III; Andrew G. Morabito; Ian A. McKee

(57) ABSTRACT

A computer identifies a sample document and annotates the sample document using a plurality of annotators to produce annotations associated with the sample document. The computer determines a plurality of patterns in the sample document based on the annotations. The computer populates a template using the patterns, and varies parts of the patterns in the template to generate test data. The computer identifies a knowledge domain of the sample document and identifies at least one of the annotators based on the knowledge domain of the sample document. The computer determines the observed occurrence count of at least one of the patterns in the sample document, and the likelihood of populating the template using the at least one of the patterns can be proportional to the observed occurrence count.

8 Claims, 4 Drawing Sheets

(56) References Cited

U.S. PATENT DOCUMENTS

| | | |
|---|---|---|
| 2002/0101920 A1 | 8/2002 | Choi et al. |
| 2003/0046078 A1* | 3/2003 | Abrego et al. ............... 704/260 |
| 2004/0034520 A1* | 2/2004 | Langkilde-Geary et al. ..... 704/1 |
| 2004/0078190 A1* | 4/2004 | Fass ..................... G06F 17/241 704/7 |
| 2005/0039107 A1* | 2/2005 | Hander ............... G06F 17/2881 715/256 |
| 2005/0060187 A1 | 3/2005 | Gottesman |
| 2006/0005067 A1 | 1/2006 | Llyod, Jr. |
| 2006/0064570 A1 | 3/2006 | di Savoia |
| 2006/0101397 A1* | 5/2006 | Mercer et al. ............... 717/120 |
| 2006/0112131 A1* | 5/2006 | Harrold ............... G06F 17/2276 |
| 2006/0224777 A1 | 10/2006 | Sand et al. |
| 2006/0235843 A1* | 10/2006 | Musgrove et al. ............... 707/6 |
| 2007/0055662 A1* | 3/2007 | Edelman et al. ................. 707/6 |
| 2007/0106977 A1* | 5/2007 | Arguelles ...................... 717/115 |
| 2008/0065941 A1* | 3/2008 | Lammel et al. ............... 714/746 |
| 2008/0205742 A1* | 8/2008 | Lund ............................. 382/141 |
| 2008/0270120 A1* | 10/2008 | Pestian et al. .................... 704/9 |
| 2009/0249121 A1* | 10/2009 | Kube et al. ...................... 714/32 |
| 2009/0276506 A1 | 11/2009 | Tiwari et al. |
| 2010/0049590 A1* | 2/2010 | Anshul ............... G06F 17/2785 705/7.32 |
| 2010/0235165 A1* | 9/2010 | Todhunter et al. ................. 704/9 |
| 2010/0318481 A1 | 12/2010 | Feynman |
| 2011/0157620 A1* | 6/2011 | Nordback ............. G06F 11/263 358/1.15 |
| 2012/0089622 A1 | 4/2012 | Fan et al. |
| 2013/0031097 A1* | 1/2013 | Sutter ............... G06F 17/30616 707/737 |
| 2013/0145250 A1* | 6/2013 | Neumueller et al. ......... 715/234 |
| 2013/0263089 A1* | 10/2013 | Banerjee et al. ............... 717/124 |

OTHER PUBLICATIONS

Whiting, Mark A.; "Creating Realistic, Scenario-Based Synthetic Data for Test and Evaluation of Information Analytics Software"; BELIV; Apr. 5, 2008; Florence, Italy; Copyright 2008.

Office Action for U.S. Appl. No. 13/655,847, Mailed Jan. 15, 2015.

Office Action for U.S. Appl. No. 13/655,847, Mailed Jul. 8, 2015.

U.S. Appl. No. 13/655,847, entitled "Generation of Test Data Using Text Analytics", filed Oct. 19, 2012; pp. 1-29.

Whiting, Mark A.; "Creating Realistic, Scenario-Based Synthetic Data for Test and Evaluation of Information Analytics Software"; BELIV; Apr. 5, 2008; Florence, Italy; Copyright 2008; pp. 1-9.

* cited by examiner

GENERATION OF TEST DATA USING TEXT ANALYTICS

CROSS REFERENCE TO RELATED APPLICATION

This application is a continuation of U.S. patent application Ser. No. 13/655,847 filed Oct. 19, 2012 the entire content and disclosure of which is incorporated herein by reference.

FIELD OF THE INVENTION

The present invention relates generally to the generation of test data, and more particularly to generation of test data using a text analytics technique.

BACKGROUND

Testing, particularly as applied to computer hardware and software, is an ongoing task in development and maintenance activities which requires a large portion of time, computer and human resources, and effort. Software development may include the development of an entirely new application or program, or the addition of a new feature to an existing application. Software maintenance activities generally include the correction of reported problems. Similarly, for example, hardware development may include the development of a new computer chip, or an improvement to an existing computer chip.

Testing is typically performed to verify proper functioning of new hardware and software, as well as to verify correctness of a modification or an improvement to existing hardware and software.

Typically, test data is used as an input during testing of hardware and software to provide, for example, sample inputs of real-time conditions under which the hardware or software functions to enable problem detection and resolution. During testing, a developer or maintainer typically attempts to debug hardware or software by detecting and solving problems associated with a product prior to the product, for example, reaching a user or customer.

Generally, as the complexity of hardware and software increases, the complexity of testing also increases. For example, as the design of a software module increases in complexity, the number and combination of test cases needed to ensure that each portion of the software module functions correctly may also increase.

Adequately and thoroughly testing hardware and software is typically an important aspect of development and maintenance. In testing, it is important that the test data provide thorough testing coverage, for example, of each component and many or all combinations of components, to adequately test combinations of the components as they may be used outside of the testing environment.

One technique used to generate test data includes manually writing each test data case. For example, each test data case may be manually entered into a file in a computer system using an input device such as a keyboard connected to a terminal.

This technique has several drawbacks. One drawback is that when such data entry is performed manually, it is often cumbersome and time-consuming. Also, the possibility of a data entry error causing incorrect data to be entered and used generally increases with manual data entry. Another drawback is that a human typically constructs each data case. This often results in incomplete testing coverage because a combination may easily be omitted. Particularly as the complexity of the hardware or software being tested increases, the probability that a necessary test case is omitted also increases because the various combinations of elements to be tested increases. In summary, manual data entry is typically costly, inefficient, and prone to human error.

Another method of generating test data includes using a software tool to automatically generate test data. This is an improvement over the previous manual data entry technique because it is more efficient and less prone to human error due to the decreased requirement of human interaction. However, current tools used for this purpose have drawbacks and often lack desirable features and functions.

Generally, tools currently available use random or exhaustive test data generation methods that are associated with an input data set. For example, a random generation method randomly selects data elements in a first input data set to be included in a generated test data case. An exhaustive generation method may, for a single input data set, alternate through each data element. Random test data generation methods can provide broad coverage but may still have significant gaps in coverage. Exhaustive test data generation avoids gaps in coverage, but may not be feasible, or even possible, in circumstances in which the number of possible combinations of input parameters and initial states is intractably large. Thus, there are drawbacks associates with both random and exhaustive test data generation methods.

SUMMARY

Embodiments of the present invention provide for a program product, system, and method in which a computer identifies a sample document and annotates the sample document using a plurality of annotators to produce annotations associated with the sample document. The computer determines a plurality of patterns in the sample document based on the annotations. The computer populates a template using the patterns, and varies parts of the patterns in the template to generate test data. The computer identifies a knowledge domain of the sample document and identifies at least one of the annotators based on the knowledge domain of the sample document. The computer determines the observed occurrence count of at least one of the patterns in the sample document, and the likelihood of populating the template using the at least one of the patterns can be proportional to the observed occurrence count.

DETAILED DESCRIPTION

Figure 1:
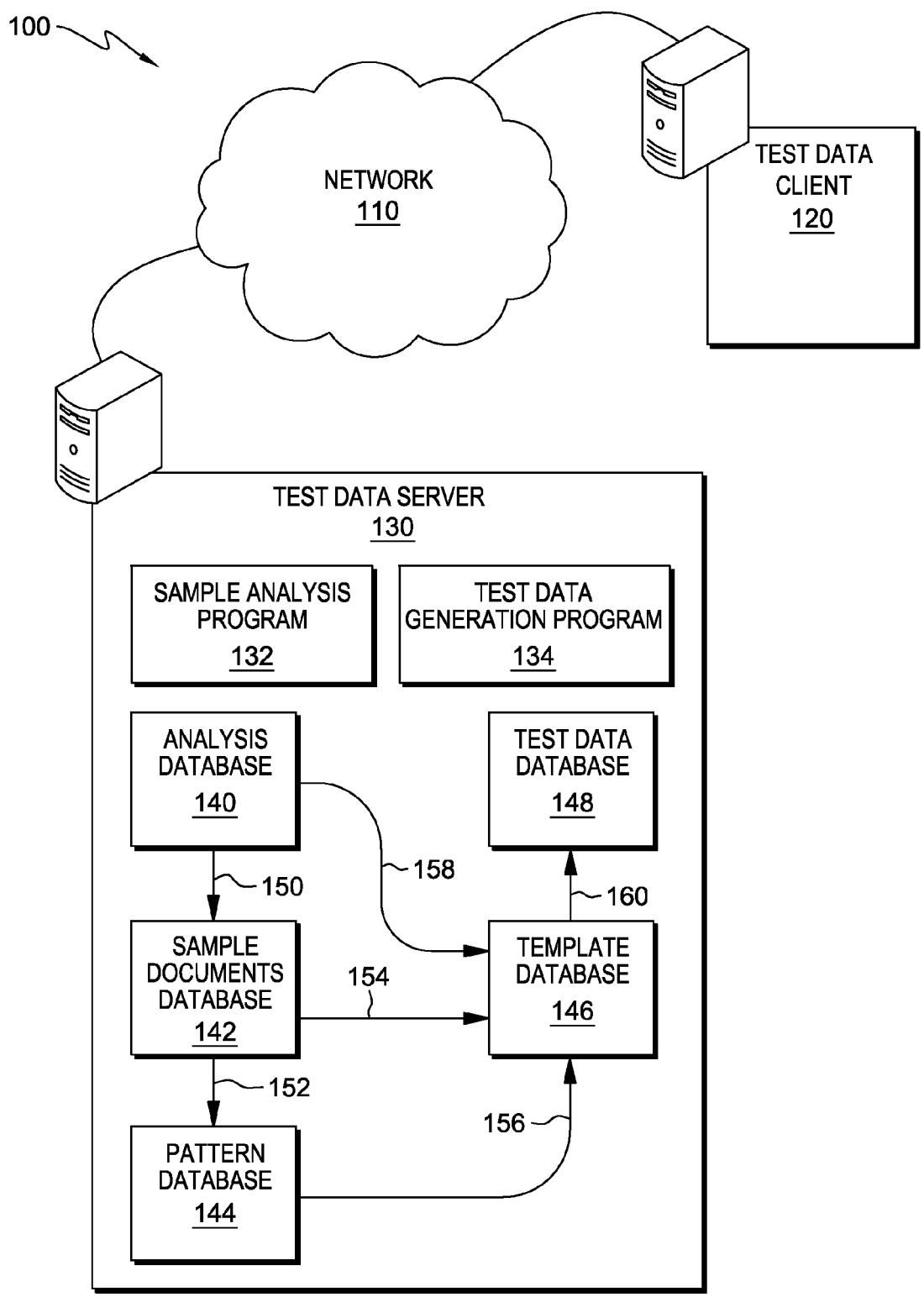
FIG. 1 is a functional block diagram of a test environment in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a functional block diagram of test environment 100 in accordance with an embodiment of the present invention is shown. Test environment 100 includes network 110, test data client 120, and test data server 130. Network 110 can be, for example, a local area network (LAN), a wide area network (WAN) such as the Internet, or a combination of the two, and can include wired or wireless connections. In general, network 110 can be any combination of connections and protocols that will support communications via various channels between test data client 120 and test data server 130 in accordance with an embodiment of the invention.

In various embodiments, each one of test data client 120 and test data server 130 can include a laptop, tablet, or netbook personal computer (PC), a desktop computer, a personal digital assistant (PDA), a smart phone, a mainframe computer, or a networked server computer. Further, one or both of test data client 120 and test data server 130 can be computing systems utilizing clustered computers and components to act as single pools of seamless resources when accessed through network 110, or can represent one or more cloud computing datacenters. In general, each one of test data client 120 and test data server 130 can be any programmable electronic device as described in further detail with respect to FIG. 4.

Test data client 120 includes a client program (not shown) for applying test data from test data server 130 to a target program under test. A target program under test can be, for example, a software application presently in development, a live software application presently being utilized by end users, a software model of a hardware microprocessor, an actual hardware microprocessor in a test harness, or any other target program. The subject matter of the target program can belong to many different knowledge domains, and in various embodiments the current technique is adaptable to a variety of knowledge domains. The client program for applying test data can request the test data from test data server 130 via network 110.

Test data server 130 can communicate with test data client 120 via a client program of test data client 120, as discussed above. Test data server 130 includes sample analysis program 132 and test data generation program 134, which perform text analytics against a corpus of sample documents to generate test data, utilizing databases 140, 142, 144, 146, and 148. Databases 140, 142, 144, 146, and 148 are not limited to being data repository databases, and in various embodiments can be files, file systems, or even programs. Text analytics can be performed using an Unstructured Information Management Architecture (UIMA) application configured to analyze unstructured information to discover patterns. Sample documents in sample documents database 142 are generally unstructured information. "Unstructured information" is defined herein as information whose intended meaning is only implied by its form. One suitable example of unstructured information is a natural language document organized merely into sentences, paragraphs, and pages. "Structured information" is defined herein as information whose intended meaning is unambiguous and explicitly represented in the structure or format of the data. One suitable example is a database table.

Sample analysis program 132 utilizes the contents of analysis database 140 to detect patterns in the corpus of sample documents stored in sample documents database 142, and stores the patterns and their occurrence counts in pattern database 144. The documents in sample documents database 142 are typically selected by a user of test data server 130, as representative of a type of test data that the user would like to have generated. For example, if the user is interested in generating test data in the form of electronic insurance records (e.g., insurance claim forms, customer claim histories, insurance settlements, etc.), then the user can populate sample documents database 142 with sample electronic insurance records. Test data server 130 can automatically provide a useful set of newly generated test data in the form of electronic insurance records on the basis of relatively few sample electronic insurance records. The sample documents in sample documents database 142 can be unstructured information, and the generated test data can also be unstructured information. The documents in sample documents database 142 can be of any type and can be related to any subject matter.

The contents of analysis database 140 include annotators and dictionaries. Sample analysis program 132 can maintain an analysis structure in analysis database 140, which provides the annotators with a facility for efficiently building and searching the analysis structure. The analysis structure is a data structure that is mainly composed of meta-data descriptive of sub-sequences of the text of a sample document in sample documents database 142. An exemplary type of meta-data in an analysis structure is an annotation. An annotation is an object, with its own properties, that is used to annotate a sequence of text. There are an arbitrary number of types of annotations. For example, annotations may label sequences of text in terms of their role in the sample document's structure (e.g., word, sentence, paragraph, etc), or to describe them in terms of their grammatical role (e.g., noun, noun phrase, verb, adjective, etc.). Annotations may further determine the knowledge domain of a sample document (e.g., the insurance domain, the engineering domain, the medical domain, the computer programming domain, the finance domain, the customer service and support domain, etc.) There is essentially no limit on the number of, or application of, annotations. Other examples include annotating segments of text to identify them as proper names, locations, times, events, equipment, conditions, temporal conditions, relations, biological relations, family relations, or other items of significance or interest.

In transaction 150, for each sample document in sample documents database 142 sample analysis program 132 can annotate the sample document to determine patterns in the sample document. A pattern is a generic formulation of a word, sentence, or other grammatical structure that can form the basis for later test data generation by variation of its parts. For example, for a corpus of sample documents related to the insurance field, a sentence in a sample document "Mr. Smith called to report a minor accident" could be annotated to determine the pattern "<customer-name> <communication> <accident>," which could then be stored in pattern database 144 in transaction 152. Annotating the sample document can further include determining the knowledge domain of the sample document, as a prelude to narrowing a range of further applicable annotators, or as a part of identifying domain-specific parts of speech in the sample document, or in order to select domain-specific rules and dictionaries.

In transaction 152, sample analysis program 132 populates pattern database 144 with patterns and their observed frequencies. For example, if a pattern has not been observed in the corpus of sample documents previously, then the observed occurrence count can be set to one. However, if the same pattern has been observed, then the observed occurrence count can be incremented by one. Thus, if both the above sentence is observed and a sentence "Mr. Jones stated that his car was hit by another" is observed, and they both can be annotated to determine the pattern "<customer-name> <communication> <accident>," then the pattern is stored in pattern database 144 with an observed occurrence count of two. There are an arbitrary number of types of patterns. Patterns can be observed on the basis of a single annotation, or can be observed on the basis of a combination of annotations. Annotations can be combined to observe patterns in sequence or in parallel usage.

Having populated pattern database 144 with patterns and their frequencies, sample analysis program 132 has thus provided test data generation program 134 with information useful for generating test data. Test data generation program 134 can automatically populate template database 146 with templates derived from sample documents in sample documents database 142 in transaction 154. Further, test data generation program 134 can use the contents of pattern database 144 to populate a template in template database 146 with patterns in transaction 156, use analysis database 140 to vary the parts of the patterns in the template in transaction 158, and use the template to generate test data stored in test data database 148 in transaction 160.

In transaction 154, test data generation program 134 can automatically populate template database 146 with templates derived from sample documents in sample documents database 142, by importing organizational features of a sample document into a template (although the sample documents in sample documents database 142 are generally unstructured information, they may still exhibit organizational features such as titles, paragraph headings, section numerals, etc., which are suitable for importation into a template). In one embodiment, a user can manually populate template database 146 with a template by, for example, crafting a template having a structure suitable for the generation of test data in a particular format.

In transaction 156, test data generation program 134 can use the contents of pattern database 144 to populate a template in template database 146 with patterns. The population of a template with patterns can be informed by user input that designates, for example, the desired word count of the generated test data, or the desired number of sentences, etc. A template is populated with patterns by, for example, inserting multiple patterns into a single template, where the probability or likelihood of inserting a given pattern into a template is proportional to its associated observed occurrence count. Thus, for example, a pattern that appeared frequently in the corpus of sample documents of sample documents database 142 can have a higher chance of being inserted into a template than a pattern that only appeared once in the corpus of sample documents. Furthermore, a template can also be populated with patterns by, for example, inserting multiple portions of patterns into a single template in combination, such that a first portion of a first pattern and a second portion of a second pattern are combined and inserted into the template as a single combined pattern. Further still, two or more patterns can be grammatically combined by inserting a comma or other punctuation between them in the template. After a given template is populated with patterns, it can be used to generate test data.

In transaction 158, test data generation program 134 can use analysis database 140 to vary the parts of the patterns in a template. In particular, test data generation program 134 can use analysis database 140 to vary the parts of the patterns in a template by, for example, filling in the pattern with data from one or more dictionaries of analysis database 140. For example, if the template includes the pattern "<customer-name> <communication> <accident>," then the pattern can be varied by filling it in with data from a naming dictionary, a verb dictionary, and an insurance dictionary. In particular, the pattern can be varied by filling in the <customer-name> portion with a name selected from a naming dictionary. The naming dictionary can be populated with a broad variety of names. Thus, the portion of the pattern might be filled in with "Mrs. Jones." Further, the pattern can be varied by filling in the <communication> portion with a verb selected from a verb dictionary. For example, the verb dictionary can include various forms of communication and their synonyms. Thus, the portion of the pattern might be filled in with "emailed about." Further, the pattern can be varied by filling in the <accident> portion with an accident or other insurance event selected from an insurance dictionary. For example, the insurance dictionary can include various forms of accidents, automobile damage, or other events. Thus, the portion of the pattern might be filled in with "an automobile collision." In summary, the parts of the pattern can be filled in to recite "Mrs. Jones emailed about an automobile collision," in one example. By randomly selecting the portions of each dictionary used to vary the parts of the pattern, a wide range of test data can be generated from a given pattern. Further, by ensuring that a number of patterns are in a given template, a wide range of test data is further ensured.

In transaction 160, test data generation program 134 can use the template to generate test data stored in test data database 148 by repeatedly varying the parts of the multitude of patterns in each template, and storing each variation as a separate test data output in test data database 148. The generated test data can be unstructured test data. In this manner, a large amount of test data can be generated, wherein the amount of variety is limited only by the permutations or combinations of templates, patterns, dictionaries, annotators, and the corpus of sample documents. In one embodiment, instead of storing the generated test data in test data database 148, the test data is streamed over network 110 for use at test data client 120.

Figure 2:
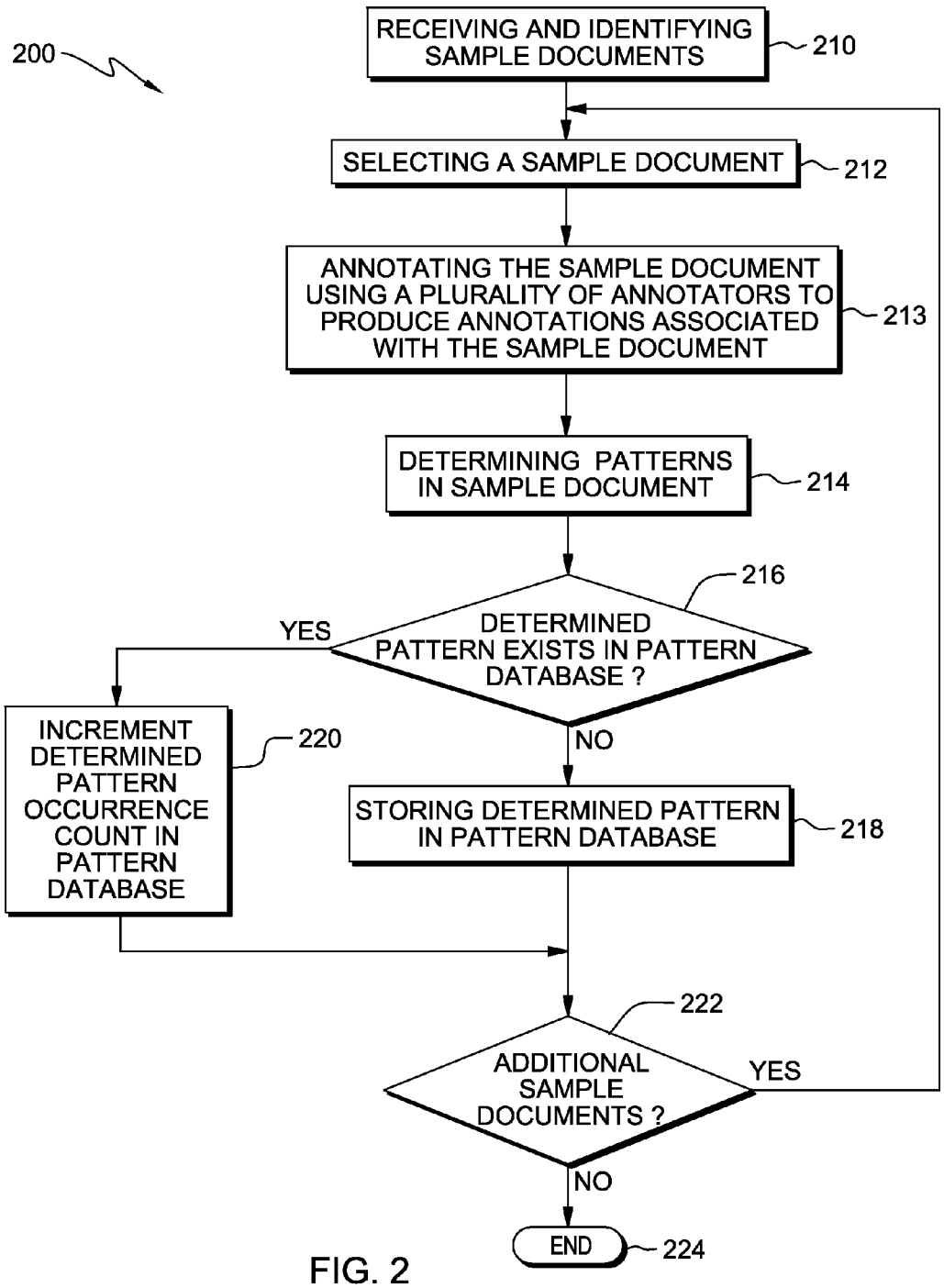
FIG. 2 is a flowchart depicting steps followed by a sample analysis program during the performance of test data generation in accordance with an embodiment of the present invention.

FIG. 2 is a flowchart depicting steps followed by sample analysis program 132 during the performance of test data generation in accordance with an embodiment of the present invention. It should be understood that in various embodiments steps can be performed in orders different from that depicted. In step 210, sample analysis program 132 receives and identifies sample documents and stores them in sample documents database 142. The corpus of sample documents is typically selected by a user of test data server 130 as representative of a type of test data that the user would like to have generated. In step 212, sample analysis program 132 selects a sample document from the corpus. In step 213 sample analysis program 132 annotates the sample document using a plurality of annotators to produce annotations associated with the sample document. In step 214 sample analysis program 132 determines patterns in the selected sample document. A pattern can be a generic formulation of a word, sentence, or other grammatical structure that can form the basis for later test data generation by variation of its parts.

In step 216, sample analysis program 132 determines whether a determined pattern exists in pattern database 144. If it does not, then in step 218 sample analysis program 132 stores the determined pattern in pattern database 144. If it does, then in step 220 sample analysis program 132 increments the observed occurrence count of the determined pattern in pattern database 144 by one. After either of step 218 or step 220, in step 222 sample analysis program 132 determines whether there are additional sample documents in sample documents database 142. If there are, then sample analysis program 132 repeats step 212 by selecting the next sample document. If there are not, then in step 224 sample analysis program 132 ends. After sample analysis program 132 ends, test data generation program 134 has thus been provided with information useful for generating test data.

Figure 3:
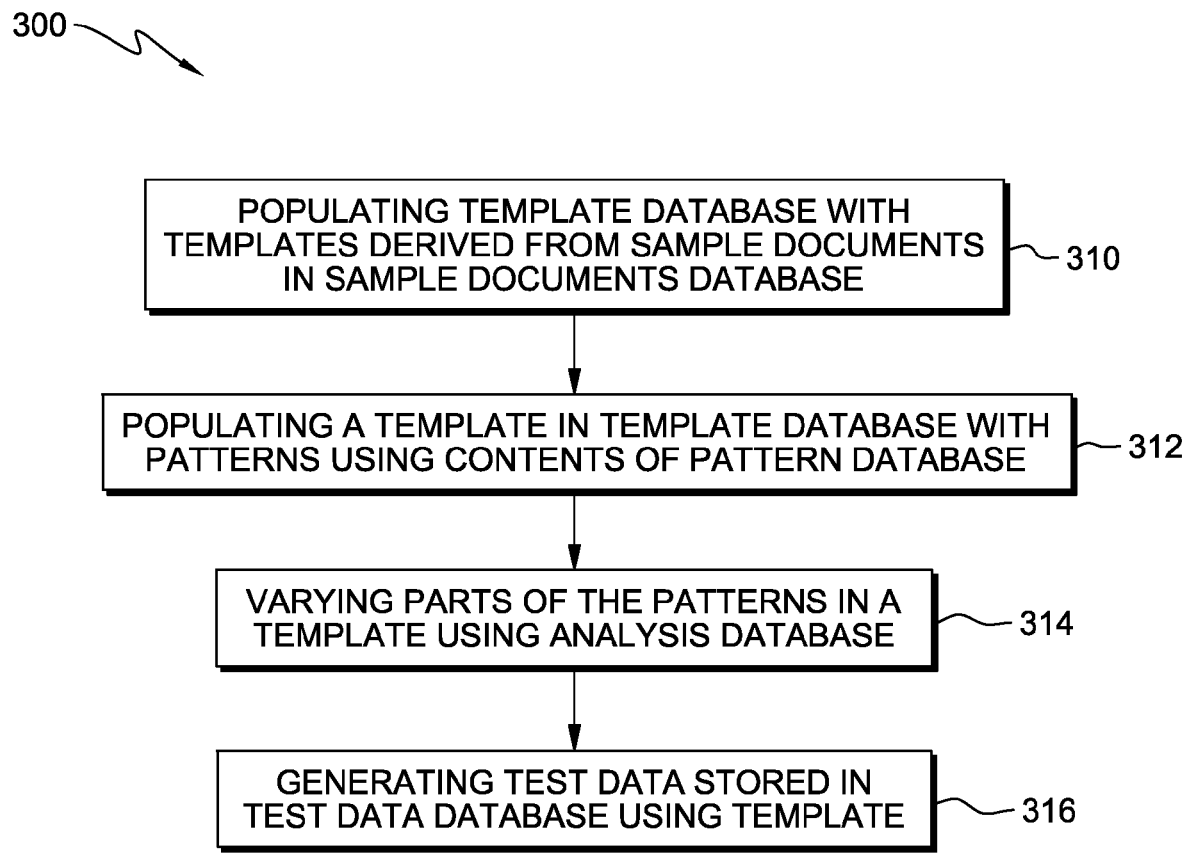
FIG. 3 is a flowchart depicting steps followed by a test data generation program during the performance of test data generation in accordance with an embodiment of the present invention.

FIG. 3 is a flowchart depicting steps followed by test data generation program 134 during the performance of test data generation in accordance with an embodiment of the present invention. It should be understood that in various embodiments steps can be performed in orders different from that depicted. In step 310, test data generation program 134 populates template database 146 with templates derived from sample documents in sample documents database 142. For example, test data generation program 134 can import organizational features of a sample document into a template. In step 312, test data generation program 134 populates a template in template database 146 with patterns using the contents of pattern database 144. In particular, the template can be populated with patterns by inserting multiple patterns into the template, where the probability of inserting a given pattern is proportional to its associated occurrence count. In step 314, test data generation program 134 varies the parts of the patterns in a template using analysis database 140. For example, test data generation program 134 can fill in the pattern with data from one or more dictionaries of analysis database 140. In step 316, test data generation program 134 generates test data using a template, by repeatedly varying the parts of the multitude of patterns in the template, and storing each variation as a separate test data output in test data database 148.

Figure 4:
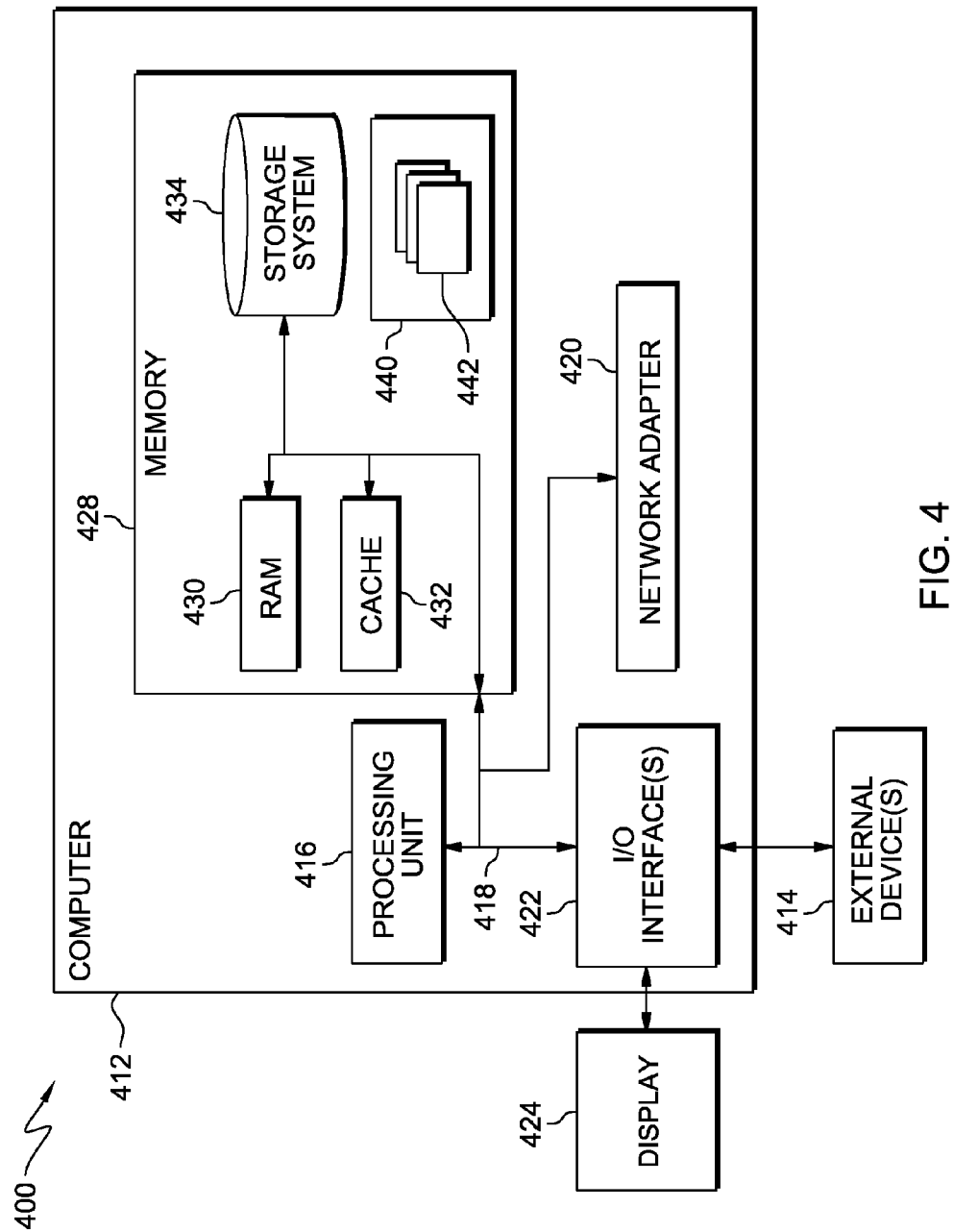
FIG. 4 is a functional block diagram of a computer system in accordance with an embodiment of the present invention.

Referring now to FIG. 4, a functional block diagram of a computer system in accordance with an embodiment of the present invention is shown. Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove.

In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of test data client 120 and test data server 130 can include or can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 in computer system 400 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 can include computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program 440, having one or more program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Each one of sample analysis program 132 and test data generation program 134 can be implemented as or can be an instance of program 440.

Computer 412 may also communicate with one or more external devices 414 such as a keyboard, a pointing device, etc., as well as display 424; one or more devices that enable a user to interact with computer 412; and/or any devices (e.g., network card, modem, etc.) that enable computer 412 to communicate with one or more other computing devices. Such communication can occur via Input/Output (I/O) interfaces 422. Still yet, computer 412 can communicate with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating test data, the method comprising:
 a computer receiving a corpus of sample documents associated with a knowledge domain, wherein each sample document of the corpus includes unstructured information;
 the computer identifying a sample document of the corpus of sample documents;
 the computer identifying that the knowledge domain of the sample document is associated with a database, wherein the database contains resources relevant to the knowledge domain including, at least, a plurality of annotators associated with the knowledge domain and a knowledge domain specific dictionary;
 the computer annotating the sample document using the plurality of annotators associated with the knowledge domain to produce annotations associated with the sample document;

the computer determining a plurality of patterns in the sample document based on the annotations, wherein each pattern comprises a combination of annotations in a sequence;

the computer populating a template using the at least one of the plurality of patterns; and the computer varying parts of the at least one of the plurality of patterns in the template to generate test data, wherein varying the at least one of the plurality of patterns comprises identifying portions of data from the knowledge domain specific dictionary corresponding to an annotation of the at least one of the plurality of patterns and inserting a portion of data from the knowledge domain specific dictionary corresponding to the annotation into the at least one of the plurality of patterns based on the sequence of the combination of annotations.

2. The method of claim 1, further comprising:

the computer maintaining an observed occurrence count of each determined pattern in the corpus of sample documents.

3. The method of claim 1, wherein the computer populating the template using the at least one of the plurality of patterns includes combining the at least one of the plurality of patterns and a second pattern of an additional sample document of the corpus of sample documents.

4. The method of claim 1, wherein the portion of data is randomly selected from the portions of data from the knowledge domain specific dictionary corresponding to the annotation.

5. The method of claim 1, wherein each annotation corresponds to at least one of the following: word, sentence, or sequence of text.

6. The method of claim 1, wherein the knowledge domain is selected from the group consisting of: insurance, engineering, medicine, computer programming, and finance.

7. The method of claim 2, wherein the computer populating a template using the at least one of the plurality of patterns comprises:

the computer selecting the at least one of the plurality of patterns based on proportions of an observed occurrence count of the at least one of the plurality of patterns in relation to a total number of patterns; and the computer populating the template using the at least one of the plurality of patterns.

8. The method of claim 1, wherein the sample document includes at least one organizational feature, further comprising:

incorporating, by one or more processors, the at least one organizational feature into the template.

* * * * *